(12) United States Patent
Bertin

(10) Patent No.: US 8,190,898 B2
(45) Date of Patent: May 29, 2012

(54) PORTABLE ELECTRONIC ENTITY AND COMMUNICATION METHOD

(75) Inventor: Marc Bertin, La Celle les Bordes (FR)

(73) Assignee: Oberthur Technologies, Levallois-Perret (FR)

( * ) Notice: Subject to any disclaimer, the term of this patent is extended or adjusted under 35 U.S.C. 154(b) by 1186 days.

(21) Appl. No.: 11/965,782

(22) Filed: Dec. 28, 2007

(65) Prior Publication Data
US 2008/0192933 A1    Aug. 14, 2008

(30) Foreign Application Priority Data

Feb. 12, 2007    (FR) ...................... 07 53197

(51) Int. Cl.
*H04L 9/32* (2006.01)
*H04K 1/00* (2006.01)

(52) U.S. Cl. .................... 713/171; 380/258; 380/270

(58) Field of Classification Search .................. 713/171; 380/258, 270
See application file for complete search history.

(56) References Cited

U.S. PATENT DOCUMENTS 7,213,766 B2 *  5/2007  Ryan et al. .................... 235/492
2005/0274803 A1 * 12/2005 Lee .............................. 235/439
2007/0283163 A1 * 12/2007 Relyea ......................... 713/184
2009/0049521 A1 *  2/2009 Le Rouzic et al. ............. 726/4

FOREIGN PATENT DOCUMENTS

| EP | 1260931 | 11/2002 |
|---|---|---|
| EP | 1675076 | 6/2006 |
| WO | WO 2005/050384 | 6/2005 |
| WO | WO 2006-048515 | 5/2006 |
| WO | WO 2006/121310 | 11/2006 |

* cited by examiner

*Primary Examiner* — Kambiz Zand
*Assistant Examiner* — Aubrey Wyszynski
(74) *Attorney, Agent, or Firm* — Young & Thompson

(57) ABSTRACT

The pocket portable electronic entity (400) with connection element (420) for removable connection to a host station (300), having first members (460, 470, 471) for secure communication with a remote server (100) via the connection element and the host station, second members (450, 455) for communication between the secure first communication element and a second portable electronic entity (500), and elements (440, 445) for communicating to the remote server via the secure first communication means data received from the second portable electronic entity via the second communication members.

18 Claims, 2 Drawing Sheets

PORTABLE ELECTRONIC ENTITY AND COMMUNICATION METHOD

Figure 1:
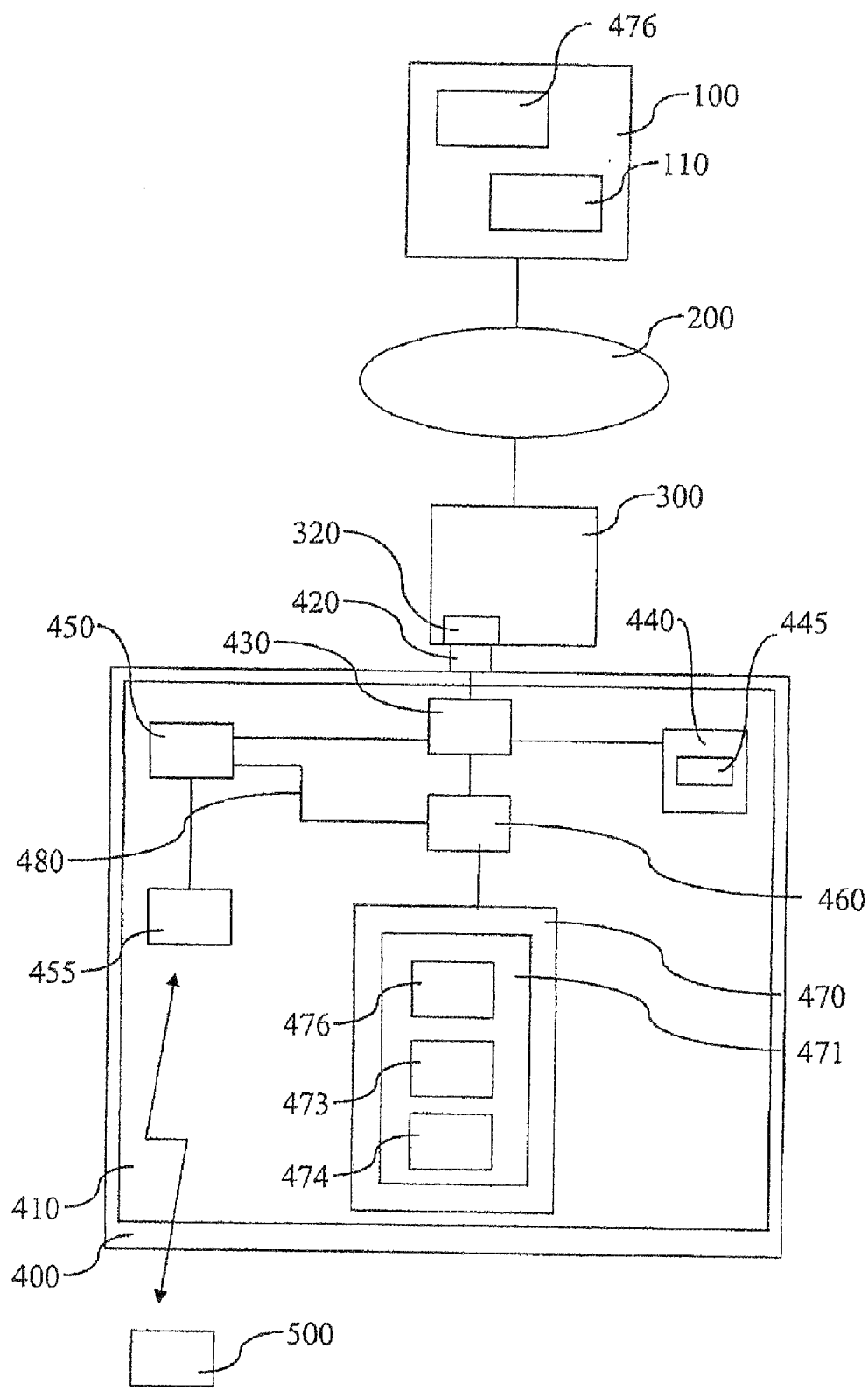

The present invention concerns a portable electronic entity serving as a terminal. It applies in particular to the production of a USB (Universal Serial Bus) electronic key, i.e. a key whose physical interface with a host computer conforms to the USB specification, able to communicate in accordance with a protocol conforming to the USB specification, this key serving as a terminal for a contactless microchip card.

A USB key is defined as a pocket electronic device disposed in an elongate body that includes, preferably in line with it, a connector using the USB protocol. The length of a key of this kind does not exceed 10 cm, and is preferably less than 6 cm, the width and the thickness are less than 5 cm, preferably less than 3 cm. If a wireless USB key is used, the USB connector can be replaced by an antenna, which may be accommodated in said elongate body.

At present, electronic commerce involves:
  either a security obstacle: the bearer must, for example, enter the number of his bank card on a web browser, which number can, for example, be obtained and transmitted to a malicious third party (for example via the Internet) by a spyware program installed fraudulently on the computer used to carry out the transaction.
  or a complexity obstacle: for example, to make the transaction secure, the user must:
    at least install, i.e. connect to a computer and install the drivers, a card reader and an application capable of managing the transaction that uses the card reader, the card and a remote server through which the purchase or transaction is effected, and
    where applicable, provide a secure terminal capable of making secure the connection with the card and the connection with the remote server through which the purchase or the transaction is effected, should the card and the server not have means for making secure communication between them of confidential data such as the bank card number.

The present invention aims to solve these problems.

To this end, a first aspect of the present invention is directed to a pocket portable electronic entity including means for removable connection to a host station, and which further includes:
  first means for secure communication with a remote server via said connection means and said host station,
  second means for communication between said secure first communication means and a second portable electronic entity, and
  means for communicating to said remote server via said secure first communication means data received from the second portable electronic entity via the second communication means.

Thanks to these provisions, the portable electronic entity that is the subject matter of the present invention constitutes a particularly simple means for installing, for example, and at the same time, a microchip card reader and the application capable of managing the transaction that involves the reader, the card and a remote server through which the purchase, or more generally a transaction, is effected. A USB key is convenient to carry around and widely recognized and accepted by the general public. What is more, this type of key generally does away with installation of drivers on the host station. Thanks to the present invention, it is used to make secure and effect transactions on any personal computer. Made secure in this way by the secure communication means, the first portable electronic entity plays the secure terminal role.

According to particular features, at least one of said second communication means includes security means.

Thanks to these provisions, it is not possible to hack into communication between the second electronic entity and said secure communication means, for example to obtain the bank card number.

According to particular features, the security means include cryptographic means.

Thanks to each of these provisions, the security of the portable electronic entity is increased.

According to particular features, the first means for secure communication with a remote server include means for mutual authentication with said remote server.

Thanks to these provisions, the security of communication between the portable electronic entity and the server is increased.

According to particular features, the first means for secure communication with a remote server include means for communication of a transaction identification data item.

According to particular features, the first means for secure communication with a remote server include cryptographic means.

Thus practical means well known to the person skilled in the art are provided for making communication secure.

According to particular features, the second communication means are wireless communication means.

According to particular features, the wireless communication means are short range, less than one meter, communication means. Thanks to these provisions, the risks of pirating between the USB key and the second electronic entity are limited, for example, and/or the transaction is allowed on the basis of an intentional gesture of the bearer: for example, the bearer presents a contactless card or a mobile telephone including very short range contactless communication means.

According to particular features, the second communication means are formed by a portable electronic entity reader.

According to particular features, the portable electronic entity reader is a microcircuit card reader.

According to particular features, the microcircuit card reader conforms to the ISO 14443 standard or alternatively the ISO 15693 standard. These provisions enable it to read cards, or more generally portable electronic entities, for example telephones or personal digital assistants, including communication means conforming to the ISO 14443 standard or the ISO 15693 standard in the variant in which the reader conforms to the same ISO 15693 standard. Note that, according to the above standards, the reader supplies power to and sends commands to a portable electronic entity by transmitting a radio field. To respond, the electronic entity responds by back-modulation of this radio field.

According to particular features, the first means for secure communication include a microcircuit card.

According to particular features, the portable electronic entity that is the subject matter of the present invention includes means for storing a program for managing the transaction with said server adapted to be executed by said host station.

According to particular features, said management program is loaded and executed on detection of the connection of the electronic entity to the host station.

According to particular characteristics, the portable electronic entity is a USB (Universal Serial Bus) electronic key.

A second aspect of the present invention is directed to a communication method using a first pocket portable elec tronic entity including means for removable connection to a host station, which includes:
- a step of secure communication with a remote server via said connection means and said host station, and
- a step of communication between the first entity and a second portable electronic entity, the step of secure communication with the remote server including a step of communication to said remote server of data received from the second portable electronic entity.

The advantages, objects and particular features of this method being similar to those of the portable electronic entity as succinctly described hereinabove, they are not repeated here.

Figure 2:
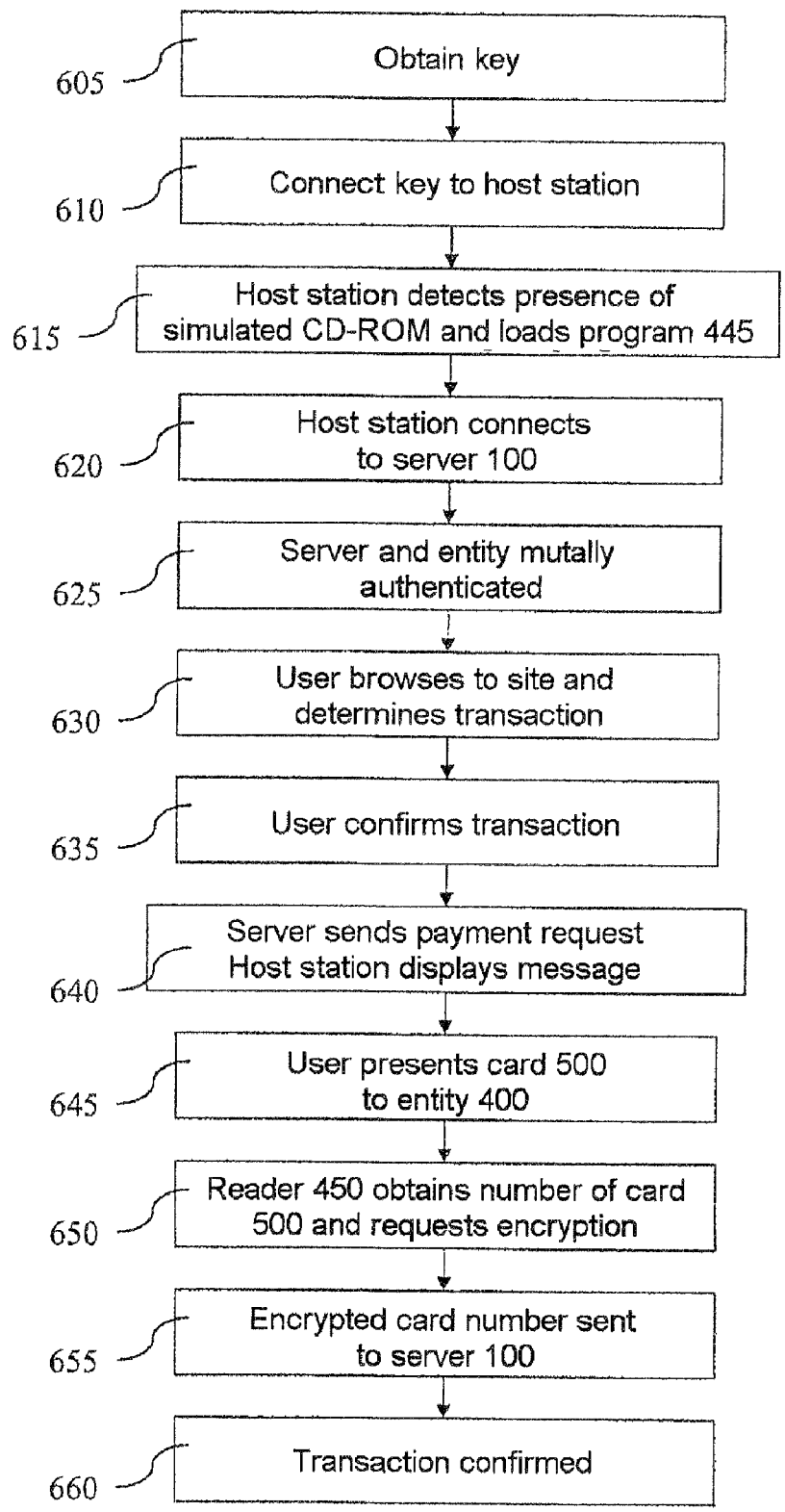

Other advantages, objects and features of the present invention will emerge from the following description given by way of nonlimiting explanation, with reference to the appended drawings, in which:

FIG. 1 represents diagrammatically a portable electronic entity that is the subject matter of the present invention and elements with which it communicates, and FIG. 2 represents in the form of a flowchart steps executed in one particular embodiment of the method that is the subject matter of the present invention.

In the embodiment shown in the figures, the present invention is applied to a USB key serving as a terminal for a contactless communication bank card. The present invention is not limited to this type of portable electronic entity or to this kind of card, however.

A USB key is defined as an electronic device disposed in an elongate body that includes a USB connector, preferably in line with it. The length of a key of this kind does not exceed 10 cm, and is preferably less than 6 cm, the width and the thickness are less than 5 cm, preferably less than 3 cm. If a wireless USB key is used, the USB connector can be replaced by an antenna, which can be accommodated in said elongate body.

First of all note that FIG. 1, which is described next, is not to scale. There are seen in FIG. 1 a server 100, a data processing network 200, a host station 300, a portable electronic entity 400 that is the subject matter of the present invention, and a second portable electronic entity 500.

The server 100 is a web site server remote from the portable electronic entity 400. For example, the server 100 is a merchant site server, on which transactions, not necessarily financial transactions, can be carried out. The server 100 stores in memory a master key 110 for generating a session key 476.

The data processing network 200, for example the Internet network, connects the server 100 to the host station 300. The host station 300 is a personal computer of a type known in the art, for example, provided with communication and web browsing software and software for communication with the portable electronic entity 400 in accordance with the USB protocol. The host station 300 includes a USB connector 320.

The second portable electronic entity 500 is a contactless communication bank card conforming to the ISO 14443 standard, for example.

The portable electronic entity 400 includes an electronic circuit 410 and means for removable connection to the host station 300, in the form of a USB connector 420. The electronic circuit 410 includes a USB hub 430 that shares communication with the host station 300 between a microcontroller 440, a card reader 460 and a card reader 450 conforming to the ISO 15693 standard. The microcontroller 440 is of a type known in the art, with non-volatile memory, for example of ROM (Read Only Memory) type, EEPROM (Electrically Erasable Read Only Memory) type or Flash type. The microcontroller 400 is adapted, in a manner known in itself, to simulate a CD-ROM (Compact Disc Read Only Memory) drive, i.e. mass storage of CD-ROM type, conforming to the USB standard. The microcontroller 440 stores in memory the instructions of an autorun program 445 that is loaded into the memory of the host station 300 and executed there automatically as soon as the connection is set up between the host station 300 and the portable electronic entity 400.

The card reader 460 is adapted to read a card 470, for example an "ID.000" format microchip card, i.e. a card to the SIM (Subscriber Identification Module) format. The card 470 includes a secure microcontroller 471 that stores in non-volatile memory a master key 473 corresponding to the master key 476 of the server 100 and a serial number 474 of the card 470.

The reader 450 is connected to an antenna 455 for short range contactless communication with the portable electronic entity 500.

The readers 450 and 460 are interconnected via the connection 480.

Thus the portable electronic entity 400, which is a USB key in the embodiment shown in FIG. 1, includes means 420 for removable connection to a host station 300 conforming to the USB standard and first and second communication means:

The first means for secure communication with the remote server 100, using the secure microcontroller 471 for security and communicating with the server 100 via removable connection means 420 and the host station 300. In the embodiment shown in FIG. 1, the host station 300 communicates with the remote server 100 via the data processing network 200. In other embodiments, the host station 300 communicates with the remote server 100 via a wireless network, for example a mobile telephone network (not shown).

The second communication means 450, 445 and 480 enable communication between the secure first communication means, in particular the secure microcontroller 471, and the second portable electronic entity 500.

The portable electronic entity also includes means for communicating with the remote server 100 via the first secure communication means. These means for communicating with the remote server 100 include in particular the program 445, the USB bus and the USB hub 430. Communication with the remote server concerns in particular data received from the second portable electronic entity 500 via the second communication means.

The USB key 400 therefore constitutes particularly simple means for, for example, installing at the same time a microchip card reader and the application capable of managing the transaction that uses the reader, the card and a remote server through which the purchase or more generally a transaction is effected. This type of key is convenient to carry around and widely recognized and accepted by the general public. According to the present invention, this key is used to effect and make secure transactions on any personal computer. Made secure in this way by the secure communication means, the first portable electronic entity plays the secure terminal role.

In some embodiments, the second communication means include security means, as explained with regard to FIG. 2. Thus it is not possible to spy on communication between the second electronic entity 500 and the means for secure communication with the portable electronic entity 400, for example to obtain the number of the bank card 500.

Note that some embodiments dispense with such security means, in particular in the case where the portable electronic entity, by construction or by virtue of its being made secure, cannot be the target of spyware attacks, for example. This is the case, for example, if loading spyware into the portable electronic entity is impossible, because loading programs into this entity is conditional upon the presentation of a secret key.

In some embodiments, the first means for secure communication with a remote server include means for authentication by said remote server. In FIG. 1, this means the keys 476 and 473.

The first means for secure communication with the remote server 100 preferably include means for communicating transaction identification data. In this case, the microcontroller 471 sends the server 100, at the same time as the number of the bank card 500, for example, an identification code of the portable electronic entity 400, a serial number of the transaction or physical information concerning the transaction such as the date or time.

In some embodiments, the first means for secure communication with a remote server 100 and/or the security means include cryptographic means of known type.

In some embodiments, the portable electronic entity 400 is made secure by physical means instead of or in addition to the cryptographic means, for example by encapsulating the components of the entity 400, except for the USB connector, in a plastic material.

In some embodiments, like that shown in FIG. 1, the second communication means are wireless communication means, for example short range, less than one meter, communication means, for limiting, for example, the risk of hacking communication between the entity 400 and the second portable electronic entity 500 and/or to effect a transaction based on an intentional gesture of the bearer since the bearer must offer up a contactless card of the entity 400.

In some embodiments, the second portable electronic entity 500 is a mobile telephone including very short range contactless communication means.

In the embodiment shown in FIG. 1, the second communication means are formed by the reader 450 of the microcircuit card 500. This reader 450 preferably conforms to the ISO 15693 standard in active mode, which enables it to read cards or more generally portable electronic entities conforming to the ISO 14443 standard. According to this ISO 14443 standard, the reader 450 supplies power to and sends commands to a portable electronic entity 500 by emitting an electromagnetic field. To respond, the electronic entity 500 responds by back-modulation of this electromagnetic field.

Alternatively, the microcontrollers 440 and 471 can be grouped together in the same microcircuit card having a USB interface.

Alternatively, the reader 460 is dispensed with, in particular if 470 is not a microcircuit card but is replaced by security, encryption and/or authentication means of some other type.

Note that each of the electronic entities and the microchip card 470 can be integrated into a mobile telephone, a personal digital assistant (PDA) or a smartphone combining these two functions.

Note, in FIG. 2, that, in one particular embodiment, the method that is the subject matter of the present invention, which can be implemented by the elements illustrated in FIG. 1, includes, first of all, a step 605, during which a user, also referred to as a "customer", obtains, in a manner known in itself, a portable electronic entity from a site manager, for example a commercial company.

Then, during a step 610, the user connects the portable electronic entity 400 to the host station 300 via the USB connectors 320 and 420.

During a step 615, the host station 300 detects the presence of a CD-ROM (in fact the CD-ROM drive simulated by the microcontroller 440) and an "autorun" type program 445, loads the program 445 into its memory and executes it.

During a step 620, the host station 300 executing the program 445 is connected to the server 100 to serve as an intermediary in communication between the portable electronic entity 400 and the server 100, i.e. it transmits to one messages coming from the other using the cryptographic means 471.

During a step 625, the host station 100 and the portable electronic entity 400 are mutually authenticated using the master keys 476 and 473, respectively, that they hold and that correspond to each other and the cryptographic means 471. The host station 100 and the portable electronic entity 400 then together create a temporary common key, or session key, from the master key 473 and the serial number 474 of the card 470. To this end, one of the session key generation methods known to the person skilled in the art is used.

Note that, where applicable and in a manner that is known in itself, the server 100 can store user preferences or a user profile.

During a step 630, the user browses the merchant site hosted by the server 100 using the program 445 executed by the host station 300 insofar as secure communication with the server 100 is concerned, using the man-machine interface of the host station 300, possibly in collaboration with its Internet browser.

During a step 635, the user confirms to the server 100 the object of the transaction that they have chosen using the program 445 executed by the host station 300.

During a step 640, the server 100 sends a request for payment to the program 445 executed on the host station 300 and the latter program displays a message on the screen of the host station 300 to request the user to proceed to payment, and for this purpose to present the bank card 500 to the portable electronic entity 400. In parallel with this, the program 445 sends a preparation message to the reader 450 to request it to transfer the information that it will receive from the bank card 500 to the card reader 460 via the link 480.

During a step 645, the user presents the bank card 500 to the portable electronic entity 400. During a step 650, the reader 450 obtains the number of the bank card 500 and sends a notification message to the program 445 executed on the host station 300. In response, the program 445 executed on the host station 300 interrogates the microcircuit card 470 to obtain the number of the card 500 in encrypted form. In parallel with this, the reader 450 transmits the number of the bank card 500 to the card reader 460 via the link 480 and the card reader 460 transmits the number of the card 500 to the microcircuit card 470, to be more precise to the microcontroller 471.

During a step 655, the microcontroller 471 transmits to the server 100 the number of the bank card 500 encrypted with the common key or the session key by means of the program 445 executed on the host station 300.

During a step 660, the transaction is validated by the server 100 and confirmed to the user in a manner that is known in itself.

Note that, instead of using the link 480, the second portable electronic entity 500 and the microcontroller 471 can alternatively communicate in an encrypted manner by means of the program 445 executed by the host station 300 using the cryptographic means available to them.

The invention claimed is:

1. A pocket portable electronic entity including means for removable connection to a host station (300), wherein it further includes:

first means for secure communication with a remote server via said connection means and said host station, second means for communication between said secure first communication means and a second pocket portable electronic entity, and means for communicating to said remote server via said secure first communication means data received from the second pocket portable electronic entity via the second communication means, wherein the second communication means is a wireless communication means for wirelessly communicating with the second pocket portable electronic entity.

2. The pocket portable electronic entity according to claim 1, wherein at least one of said first communication means includes security means for securing transmission of data to and from the first communication means.

3. The pocket portable electronic entity according to claim 2, wherein the security means includes cryptographic means for encrypting and decrypting the data transmitted to and from the first communication means.

4. The pocket portable electronic entity according to claim 2, wherein the first means for secure communication with a remote server include means for mutual authentication with said remote server.

5. The pocket portable electronic entity according to claim 2, wherein the first means for secure communication with a remote server include means for communicating transaction identification data.

6. The pocket portable electronic entity according to claim 2, wherein the first means for secure communication with a remote server include cryptographic means for encrypting and decrypting the data transmitted to and from the first communication means.

7. The pocket portable electronic entity according to claim 1, wherein the first means for secure communication with a remote server include means for mutual authentication with said remote server.

8. The pocket portable electronic entity according to claim 1, wherein the first means for secure communication with a remote server include means for communicating transaction identification data.

9. The pocket portable electronic entity according to claim 1, wherein the first means for secure communication with a remote server include cryptographic means for encrypting and decrypting the data transmitted to and from the first communication means.

10. The pocket portable electronic entity according to claim 1, wherein the wireless communication means are short range, less than one meter, communication means.

11. The pocket portable electronic entity according to claim 1, wherein the second communication means are formed by a portable electronic entity reader.

12. The pocket portable electronic entity according to claim 11, wherein the portable electronic entity reader is a microcircuit card reader.

13. The pocket portable electronic entity according to claim 12, wherein the microcircuit card reader conforms to an ISO 15693 standard.

14. The pocket portable electronic entity according to claim 1, wherein the first means for secure communication include a microcircuit card.

15. The pocket portable electronic entity according to claim 1, further comprises means for storing a program for managing a transaction with said server adapted to be executed by said host station.

16. The pocket portable electronic entity according to claim 15, wherein said program for managing the transaction is loaded and executed on detection of the connection of the pocket portable electronic entity to the host station.

17. The pocket portable electronic entity according to claim 1, wherein the portable electronic entity is a USB (Universal Serial Bus) electronic key.

18. A communication method using a first pocket portable electronic entity including means for removable connection to a host station, comprising:

a step of secure communication with a remote server via said connection means and said host station, and a step of communication between the first pocket portable electronic entity and a second pocket portable electronic entity, the step of secure communication with the remote server including a step of communication with said remote server, of data received from the second pocket portable electronic entity, wherein the step of communication between the first pocket portable electronic entity and the second pocket portable electronic entity is wireless.

* * * * *